(12) United States Patent
Masuda et al.

(10) Patent No.: US 10,068,145 B2
(45) Date of Patent: Sep. 4, 2018

(54) PHOTOGRAPHING SYSTEM CONFIGURED TO HOLD A PILL (71) Applicant: FUJI XEROX CO., LTD., Tokyo (JP)

(72) Inventors: Tadashi Masuda, Kanagawa (JP); Keiji Endo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 261 days.

(21) Appl. No.: 15/001,969

(22) Filed: Jan. 20, 2016

(65) Prior Publication Data
US 2017/0032206 A1    Feb. 2, 2017

(30) Foreign Application Priority Data

Jul. 30, 2015  (JP) .................................. 2015-150756
Aug. 10, 2015 (JP) .................................. 2015-158557

(51) Int. Cl.
G06K 9/20   (2006.01)
H04M 1/02   (2006.01)
H04N 5/225  (2006.01)
H04N 5/232  (2006.01)

(52) U.S. Cl.
CPC .......... *G06K 9/209* (2013.01); *G06K 9/2027* (2013.01); *H04M 1/0264* (2013.01); *H04N 5/2251* (2013.01); *H04N 5/2256* (2013.01); *H04N 5/23209* (2013.01); *H04M 2250/20* (2013.01)

(58) Field of Classification Search
CPC ... G06K 9/209; G06K 9/2027; H04M 1/0264; H04M 2250/20; H04N 5/23209; H04N 5/2256; H04N 5/2251; G02B 7/00; G02B 7/001; G02B 7/002; G02B 7/003; G02B 7/004; G02B 7/005; G02B 7/008; G02B 7/02; G02B 25/002; G02B 27/025; G02B 27/027
USPC .................. 348/131; 359/811, 819, 802, 818
See application file for complete search history.

(56) References Cited

U.S. PATENT DOCUMENTS

| | | | |
|---|---|---|---|
| 2007/0212059 A1* | 9/2007 | Kim ...................... | G03B 29/00 396/448 |
| 2008/0056556 A1* | 3/2008 | Eller ..................... | G06F 19/327 382/142 |
| 2013/0221082 A1* | 8/2013 | Botten ................... | G06F 17/30 235/375 |
| 2014/0072189 A1* | 3/2014 | Jena .................... | G01N 21/8483 382/128 |
| 2014/0226020 A1* | 8/2014 | Ito .......................... | G01B 11/26 348/161 |

(Continued)

FOREIGN PATENT DOCUMENTS

JP      2004-279733 A    10/2004

*Primary Examiner* — Jay Patel
*Assistant Examiner* — Marnie Matt
(74) *Attorney, Agent, or Firm* — Oliff PLC (57) ABSTRACT

Provided is a unit for photographing, including a holding member configured to hold a pill to be photographed by a photographing section, a supporting member configured to support the holding member so that the pill faces the photographing section at a position that is determined in advance from the photographing section, a fixing unit configured to fix the holding member, which is supported to the supporting member, with a magnetic force, and a switching unit configured to switch a fixed state in which the holding member is fixed by the fixing unit and a released state in which the fixing of the holding member by the fixing unit is released.

11 Claims, 6 Drawing Sheets

(56) References Cited

U.S. PATENT DOCUMENTS

| | | | |
|---|---|---|---|
| 2014/0368731 A1* | 12/2014 | Hyers | H04N 5/2252 |
| | | | 348/374 |
| 2015/0185159 A1* | 7/2015 | Morita | G01N 21/78 |
| | | | 422/82.05 |
| 2015/0253255 A1* | 9/2015 | Wagner | G01N 21/87 |
| | | | 356/30 |
| 2015/0309395 A1* | 10/2015 | Tomasewski | F16M 11/105 |
| | | | 455/575.1 |
| 2016/0163034 A1* | 6/2016 | Jacobs | G06K 9/00 |
| | | | 382/142 |
| 2016/0248951 A1* | 8/2016 | Fletcher | H04M 1/21 |

* cited by examiner

PHOTOGRAPHING SYSTEM CONFIGURED TO HOLD A PILL

CROSS-REFERENCE TO RELATED APPLICATIONS

This application is based on and claims priority under 35 USC 119 from Japanese Patent Application Nos. 2015-150756 filed Jul. 30, 2015 and 2015-158557 filed Aug. 10, 2015.

BACKGROUND (i) Technical Field

The present invention relates to a unit for photographing and a photographing system.

(ii) Related Art

For example, there is known an apparatus which photographs an image of an object to be photographed by a camera provided to a portable terminal such as a portable telephone and a smart phone, and performs verification (authenticity determination) of the object to be photographed using the image that is photographed.

SUMMARY

According to an aspect of the invention, there is provided a unit for photographing, including:

a holding member configured to hold a pill to be photographed by a photographing section;

a supporting member configured to support the holding member so that the pill faces the photographing section at a position that is determined in advance from the photographing section;

a fixing unit configured to fix the holding member, which is supported to the supporting member, with a magnetic force; and a switching unit configured to switch a fixed state in which the holding member is fixed by the fixing unit and a released state in which the fixing of the holding member by the fixing unit is released.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described in detail with reference to the accompanying drawings.

Figure 1:
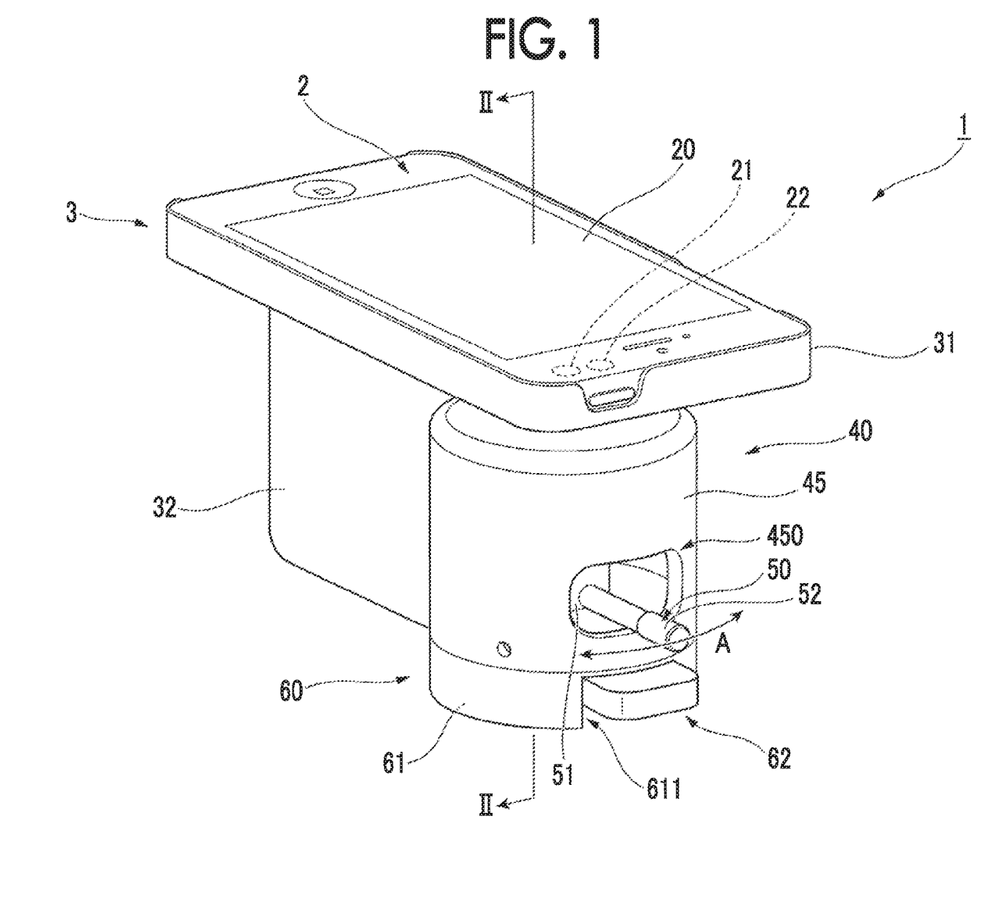
FIG. 1 is a view illustrating a schematic configuration of a photographing system to which this exemplary embodiment is applied.
Figure 2:
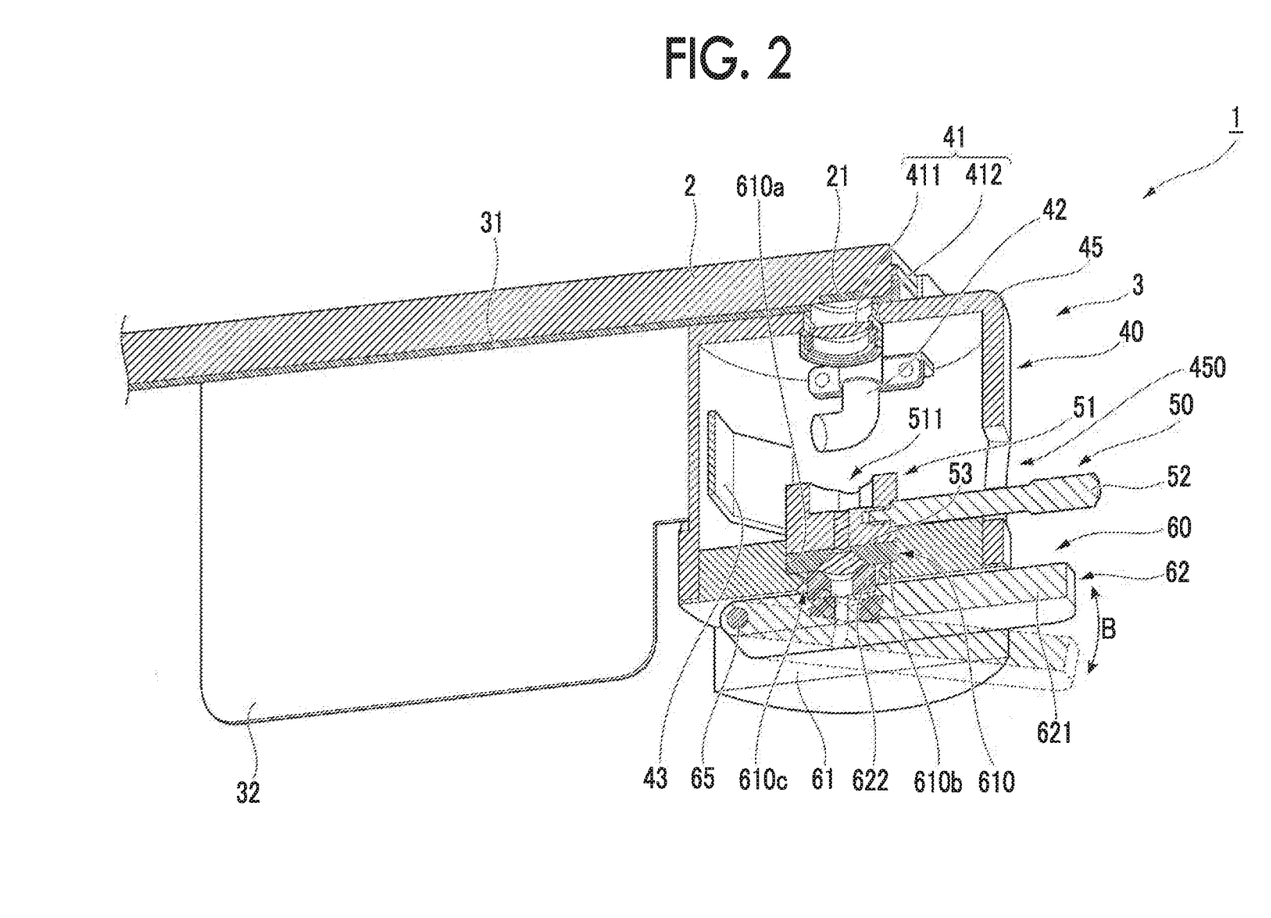
FIG. 2 is a view illustrating a schematic configuration of the photographing system to which this exemplary embodiment is applied.

FIGS. 1 and 2 are views illustrating a schematic configuration of a photographing system 1 to which this exemplary embodiment is applied. FIG. 1 is a perspective view of the photographing system 1 and FIG. 2 is a cross-sectional view taken along line II-II in FIG. 1.

As illustrated in FIGS. 1 and 2, in the photographing system 1 according to this exemplary embodiment, a unit for photographing 3 is mounted on a portable terminal 2 including a photographing section (camera function) and an illuminating unit (illumination lighting function).

For example, the portable terminal 2 according to this exemplary embodiment is realized by a portable telephone such as a smart phone. In addition, the portable terminal 2 may be realized by a tablet terminal, a digital still camera, and the like, as long as the photographing section or the illuminating unit is provided.

The portable terminal 2 includes a microprocessor, a random access memory (RAM), a storage unit that is constituted by a storage medium such as a hard disk drive, a communication interface, an operation button, and the like. In addition, an application for acquisition of pattern information is installed in the portable terminal 2 according to this exemplary embodiment.

In addition, as illustrated in FIG. 1, the portable terminal 2 includes a display 20 as an example of a display unit, a camera 21 as an example of a photographing section that is provided on a rear surface of the display 20, and a flash lamp 22 as an example of the illuminating unit.

The camera 21, which is provided to the portable terminal 2, is constituted by an imaging element such as a charge coupled device (CCD) image sensor and a complementary metal oxide semiconductor (CMOS) image sensor, an optical system such as a lens, and the like. In addition, the camera 21 photographs an image of an object to be photographed, and acquires image data. In addition, an optical axis of an optical system in the camera 21 is set to a direction that is perpendicular to the display 20 of the portable terminal 2.

In addition, the flash lamp 22, which is provided to the portable terminal 2, includes, for example, a light-emitting diode (LED) as a light-emitting element. In addition, the flash lamp 22 is configured to emit light during acquisition of an image of the object to be photographed by the camera 21.

Next, description will be given of a configuration of the unit for photographing 3 according to this exemplary embodiment. As illustrated in FIGS. 1 and 2, the unit for photographing 3 has a shape in conformity of an external shape of the portable terminal 2, and includes a mounting member 31 as an example of a mounting unit to which the portable terminal 2 is fitted and fixed, and a unit supporting portion 32 as an example of a supporting body that is fixed to the mounting member 31 and supports the entirety of the unit for photographing 3. In addition, the unit for photographing 3 includes a pill holder 50 as an example of a holding member that holds a pill that is an object to be photographed. In addition, the unit for photographing 3 includes a photographing case 40 that is fixed to the mounting member 31 and performs positioning of the pill holder 50.

An opening (not illustrated), which opens toward the photographing case 40, is formed in the mounting member 31 at a position that corresponds to the camera 21 and the flash lamp 22 of the portable terminal 2. In addition, in the photographing system 1, in a state in which the portable terminal 2 is mounted on the mounting member 31, the camera 21 of the portable terminal 2 faces a close-up lens 411 of a lens unit 41, to be described later, through the opening. In addition, the flash lamp 22 of the portable terminal 2 faces a light-guiding member 42, to be described later, through the opening.

The unit supporting portion 32 is provided on a rear surface side of the mounting member 31. In addition, the unit supporting portion 32 supports the unit for photographing 3 and the portable terminal 2 that is mounted on the unit for photographing 3 so that the display 20 of the portable terminal 2 faces a vertically upward direction during usage of the photographing system 1.

Figure 3:
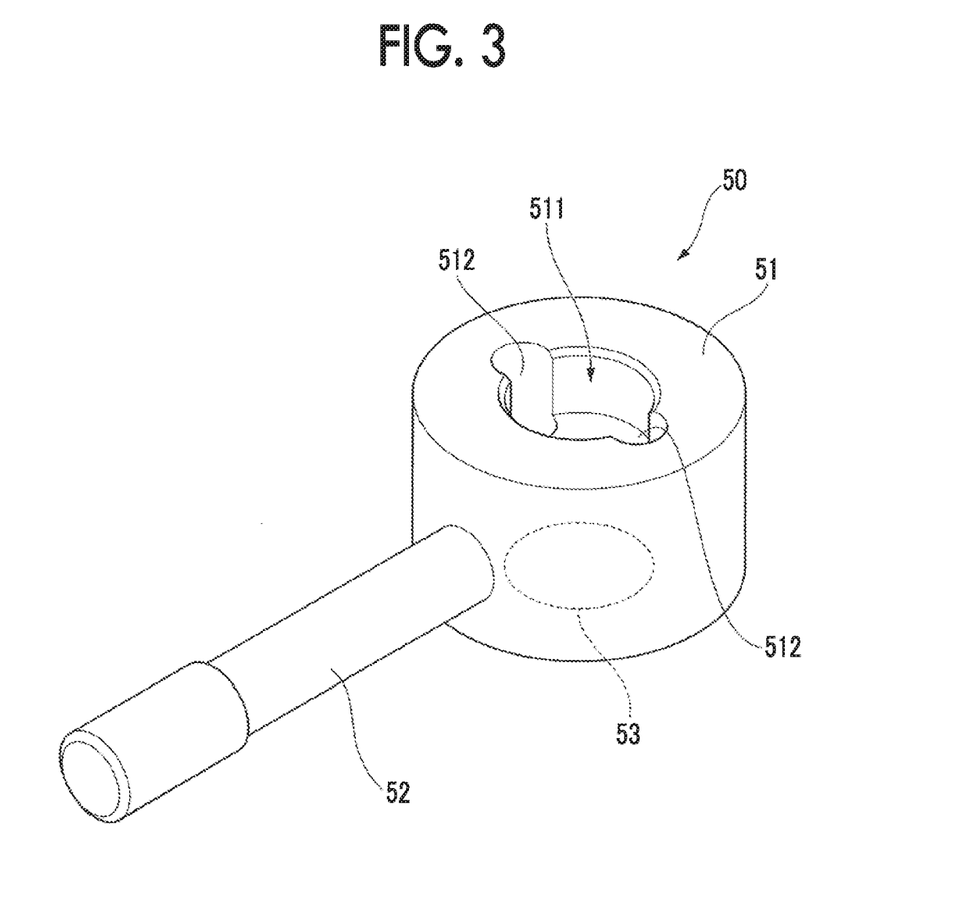
FIG. 3 is a perspective view illustrating a schematic configuration of a pill holder to which this exemplary embodiment is applied.

FIG. 3 is a perspective view illustrating a schematic configuration of the pill holder 50 to which this exemplary embodiment is applied.

As illustrated in FIG. 3 and FIG. 2, the pill holder 50 according to this exemplary embodiment includes a pill insertion portion 51 that holds a pill P (refer to FIG. 4 and the like to be described later), and an adjustment member 52 that extends from a lateral surface of the pill insertion portion 51 and adjusts an angle of the pill P in the photographing case 40. In addition, the pill holder 50 according to this exemplary embodiment includes a magnetic substance 53 that is mounted on the bottom of the pill insertion portion 51 and is formed from a material such iron having magnetism. The magnetic substance 53 according to this exemplary embodiment is constituted by an iron screw that is inserted to the bottom of the pill insertion portion 51. In addition, for example, the pill insertion portion 51 is constituted by a non-magnetic substance such as aluminum.

The pill insertion portion 51 according to this exemplary embodiment has a columnar shape as a whole. In addition, the pill insertion portion 51 has a pill opening 511 that opens toward an upper side and to which the pill P that is an object to be photographed is inserted, and a small opening 512 that is adjacent to the pill opening 511 and has a diameter smaller than that of the pill opening 511. The pill opening 511 has a columnar shape in conformity to an external shape of the pill P in accordance with the kind of the pill P. Here, the depth (height) of the pill opening 511 is set to be approximately the same as the thickness of the pill P. According to this, in a case where the pill P is put into the pill opening 511, a surface of the pill P is approximately flush with an upper surface of the pill insertion portion 51.

In addition, in a case where the pill P is placed in the pill holder 50, for example, the pill P is inserted into the pill opening 511 by pinching the pill P with a pair of tweezers and the like. In the pill holder 50 according to this exemplary embodiment, the small opening 512 is provided to be close to the pill opening 511, and the tip end of the pair of tweezers may enter the small opening 512, and thus it is easy for the pill P to be inserted into the pill opening 511.

Returning to FIGS. 1 and 2, the lens unit 41, which faces the camera 21 of the portable terminal 2 in a state in which the portable terminal 2 is mounted on the mounting member 31, is provided to the photographing case 40 according to this exemplary embodiment. As illustrated in FIG. 2, the lens unit 41 includes the close-up lens (macro lens) 411 that shortens the shortest photographing distance of the camera 21, and a cylindrical mirror barrel 412 that is mounted on a light-shielding member 45, which is to be described later, of the photographing case 40 to support the close-up lens 411.

As described above, the close-up lens 411 is disposed to face the camera 21 of the portable terminal 2. More specifically, an optical axis of the close-up lens 411 and an optical axis of the optical system in the camera 21 are set to coincide with each other.

The close-up lens 411 according to this exemplary embodiment is configured to be focused on a surface of the pill P that is placed in the pill holder 50 to be described later.

In addition, the photographing case 40 according to this exemplary embodiment includes the light-guiding member 42 as an example of a light-guiding unit that guides illuminating light, which is output from the flash lamp 22, to the inside of the photographing case 40, and a reflective member 43 that reflects the illuminating light, which is guided by the light-guiding member 42, and irradiates the pill that is held by the pill holder 50 with the illuminating light.

The light-guiding member 42 supplies the illuminating light, which is output from the flash lamp 22, to the reflective member 43. In this exemplary embodiment, the light-guiding member 42 is constituted by a tubular light-guiding member that guides the illuminating light while changing a propagation direction of the illuminating light from the flash lamp 22.

The reflective member 43 is provided to face the light-guiding member 42 (emission side of the illuminating light). In addition, the reflective member 43 reflects the illuminating light that is guided from the flash lamp 22 through the light-guiding member 42, and supplies the illuminating light to a close-up photographing portion (region that is photographed close-up by an optical system including the camera 21 of the portable terminal 2 and the close-up lens 411, and is captured as an image) of the pill P that is an object to be photographed.

For example, the reflective member 43 is constituted by a metallic sheet that is subjected to bending working, and the like.

In addition, the photographing case 40 includes the light-shielding member 45 as an example of a light-shielding member that shields the close-up photographing portion of the pill P that is held by the pill holder 50 from an outer side of the photographing case 40, and a holder holding portion 61 as an example of a supporting member that is provided on a lower side of the light-shielding member 45 and holds the pill holder 50, and a fixing member 62 that fixes the pill holder 50, which is held by the holder holding portion 61, with a force that is determined in advance by a magnetic force.

The light-shielding member 45 has a cylindrical shape as a whole, and accommodates the lens unit 41, the light-guiding member 42, and the reflective member 43. In addition, an insertion hole 450, into which the pill holder 50 is inserted, is formed on a lateral surface of the light-shielding member 45. In the light-shielding member 45 according to this exemplary embodiment, the insertion hole 450 is provided on a lower side (close to the holder holding portion 61) in comparison to the close-up lens 411 and the light-guiding member 42. In other words, the insertion hole 450 is provided to deviate from the close-up lens 411 and the light-guiding member 42 in an optical axis direction of the close-up lens 411. According to this, for example, incidence of light, which enters the light-shielding member 45 through the insertion hole 450, and the like to the camera 21 through the close-up lens 411 or the light-guiding member 42 is further suppressed in comparison to a case where the insertion hole 450 is provided to face the close-up lens 411 and the light-guiding member 42.

The holder holding portion 61 is mounted to the bottom of the light-shielding member 45, and has a disk shape as a whole. A fitting portion 610, to which the pill insertion portion 51 of the pill holder 50 is fitted, is formed in the holder holding portion 61.

The fitting portion 610 has a cylindrical shape in conformity to an external shape of the pill insertion portion 51, and includes a side wall 610a that supports a lateral surface of the pill insertion portion 51, and a bottom portion 610b that extends from the periphery of the side wall 610a toward an inner periphery, and supports the bottom surface of the pill insertion portion 51. The bottom portion 610b is constituted by a plane that is perpendicular to the optical axis direction of the camera 21 and the close-up lens 411. In addition, an opening 610c is formed at the center of the bottom portion 610b.

When the pill insertion portion 51 is fitted to the fitting portion 610, the pill insertion portion 51 is loaded on the bottom portion 610b, and positioning in the optical axis direction of the pill P, which is held by the pill insertion portion 51, is made. In addition, the lateral surface of the pill insertion portion 51 is supported by the side wall 610a, and thus positioning on a surface perpendicular to the optical axis direction of the pill P is made.

Here, in this exemplary embodiment, in a case of inserting the pill insertion portion 51 to the fitting portion 610, the side wall 610a and the pill insertion portion 51 are not completely fixed to each other. In addition, in this configuration, when rotating the adjustment member 52 as indicated by an arrow A in FIG. 1, the pill insertion portion 51 may rotate at the inside of the fitting portion 610 in a state in which the optical axis direction of the camera 21 and the close-up lens 411 is set as a rotation axis. In addition, a rotation operation of the pill insertion portion 51 will be described later in detail.

In addition, a concave portion 611, in which the fixing member 62 is provided, is formed on a lower side of the holder holding portion 61. In this exemplary embodiment, in a case where the photographing system 1 is placed on a desk on the like so that the display 20 of the portable terminal 2 faces a vertically upward side, a space for movement of the fixing member 62 is formed between the desk and the holder holding portion 61 due to the concave portion 611.

As illustrated in FIGS. 1 and 2, the fixing member 62 has a sheet shape as a whole, and includes a sheet-shaped member 621 as an example of a switching unit that is mounted to the holder holding portion 61 to rotate around an axis 65, and a magnet 622 as an example of a fixing unit or a magnetic member that is constituted by a permanent magnet and is mounted on an upper surface of the sheet-shaped member 621.

As indicated by an arrow B in FIG. 2, the sheet-shaped member 621 is configured to be rotatable around the axis 65 toward a lower side from a state in which the upper surface is in contact with the holder holding portion 61.

In addition, in a state in which the sheet-shaped member 621 is moved to the upper side, and the upper surface of the sheet-shaped member 621 comes into contact with the holder holding portion 61, the front end of the sheet-shaped member 621 protrudes from the holder holding portion 61. According to this, in this exemplary embodiment, in a state in which the photographing system 1 is placed on a desk and the like, a user may move the sheet-shaped member 621 with the front end of the sheet-shaped member 621 gripped by the user.

In addition, in a state in which the sheet-shaped member 621 is moved to an upper side, and the upper surface of the sheet-shaped member 621 comes into contact with the holder holding portion 61, the magnet 622, which is mounted on the upper surface of the sheet-shaped member 621, is inserted into the opening 610c of the holder holding portion 61. In addition, although details will be described later, when the pill holder 50 is fitted to the fitting portion 610 of the holder holding portion 61, the magnet 622 and the magnetic substance 53 of the pill holder 50 face each other through the opening 610c, and are attracted to each other due to a magnetic force.

According to this, in the unit for photographing 3 according to this exemplary embodiment, in a state in which the pill holder 50 is accommodated in the photographing case 40, the pill holder 50 (pill insertion portion 51) is fixed to the fitting portion 610 of the holder holding portion 61 with a force that is determined in advance by a magnetic force. More specifically, the pill holder 50 (pill insertion portion 51) is fixed with a force at which the pill holder 50 may be rotated at the inside of the fitting portion 610 of the holder holding portion 61 through operation of the user. In other words, in this exemplary embodiment, the size of the magnetic substance 53, the strength of the magnetic force of the magnet 622, and the like are set so that a magnetic force, at which the pill holder 50 (pill insertion portion 51) may rotate at the inside of the fitting portion 610, occurs.

Figure 4:
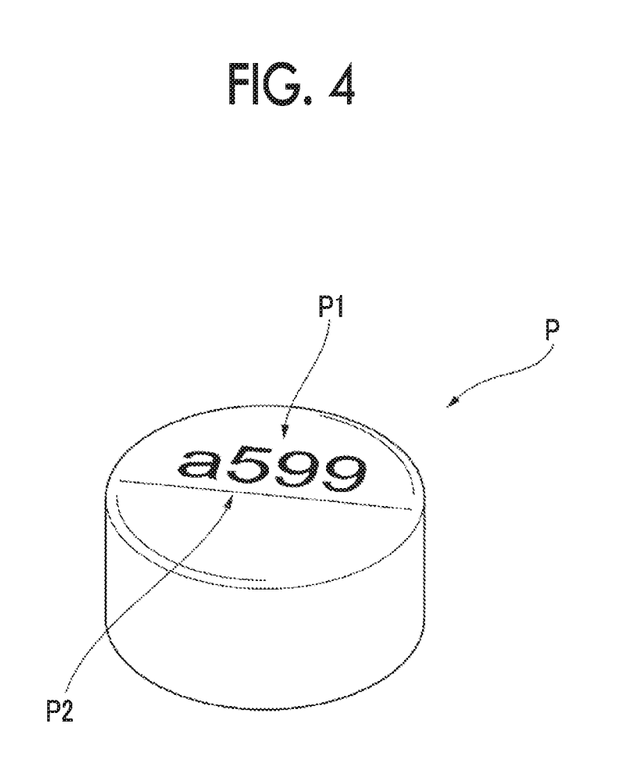
FIG. 4 is a view illustrating an example of a pill that is an object to be photographed in the photographing system according to this exemplary embodiment.

Then, description will be given of an object to be photographed in the photographing system 1 according to this exemplary embodiment. FIG. 4 is a view illustrating an example of the pill P that is an object to be photographed in the photographing system 1 according to this exemplary embodiment. In the photographing system 1 according to this exemplary embodiment, the pill P is set as an object to be photographed to perform verification (authenticity determination) of the pill P.

As illustrated in FIG. 4, for example, the pill P, which is an object to be photographed, has a columnar shape as a whole, and an identification symbol P1 that represents the kind of the pill P and the like, or a division line P2 for division of the pill P is formed on a surface of the pill P.

In the photographing system 1 according to this exemplary embodiment, information relating to pattern information of the pill P is stored in advance in the portable terminal 2 or an external device such as a server PC that is wired to or wirelessly connected to the portable terminal 2.

In addition, in a case of performing verification of the pill P, a region of the pill P, which is determined in advance, is photographed by the photographing system 1 to acquire the pattern information of the pill P. In addition, determination is made on whether or not the pattern information of the pill P, which is acquired, matches the pattern information that is stored in the portable terminal 2 or an external device to make a verification of the pill P, and a verification result is output through the display 20 of the portable terminal 2, and the like.

Here, in the photographing system 1 according to this exemplary embodiment, a random and minute pattern image, which appears on the surface of the pill P and is peculiar to the pill P, is acquired as the pattern information. The minute pattern, which is acquired by the photographing system 1 according to this exemplary embodiment, represents a minute pattern to a certain extent that is not recognized with the naked eye, and which is different from the identification symbol P1, the division line P2, and the like which are typically formed on the pill P.

Specific examples of the pattern, which is formed on the pill P, include an uneven shape that is caused from granules as a raw material of the pill P and appears on the surface of the pill P, an uneven shape that is caused from a coating agent formed on the surface of the pill P and appears on the surface of the pill P, and the like.

In the photographing system 1 according to this exemplary embodiment, typically, the region, which is determined to acquire the pattern information from the surface of the pill P, is set to a narrow range in the pill P. Accordingly, it is necessary to accurately perform the positioning of the pill P with respect to a read-out position of the camera 21, and to accurately determine the direction of the pill P with respect to the read-out direction of the camera 21 to a direction that is determined in advance so as to correctly acquire the pattern that is an object to be verified from the pill P.

In addition, the pattern of the pill P, which is acquired by the photographing system 1, is minute as described above, and thus it is necessary to perform positioning of the pill P in order for the surface of the pill P to be located at the focal position of the close-up lens 411 so as to accurately photograph a pattern image of the pill P.

Accordingly, in the photographing system 1 according to this exemplary embodiment, when acquiring the pattern information of the pill P, the pill P is inserted into the pill holder 50, and positioning of the pill holder 50 is performed in the photographing case 40 in order for the pill P to be located at a position that is determined in advance with respect to the camera 21. In addition, after positioning of the pill holder 50 at the inside of the photographing case 40, the direction of the pill holder 50 is manually adjusted by a user in order for the direction of the pill P to be a direction that is determined in advance with respect to the camera 21.

Figure 5:
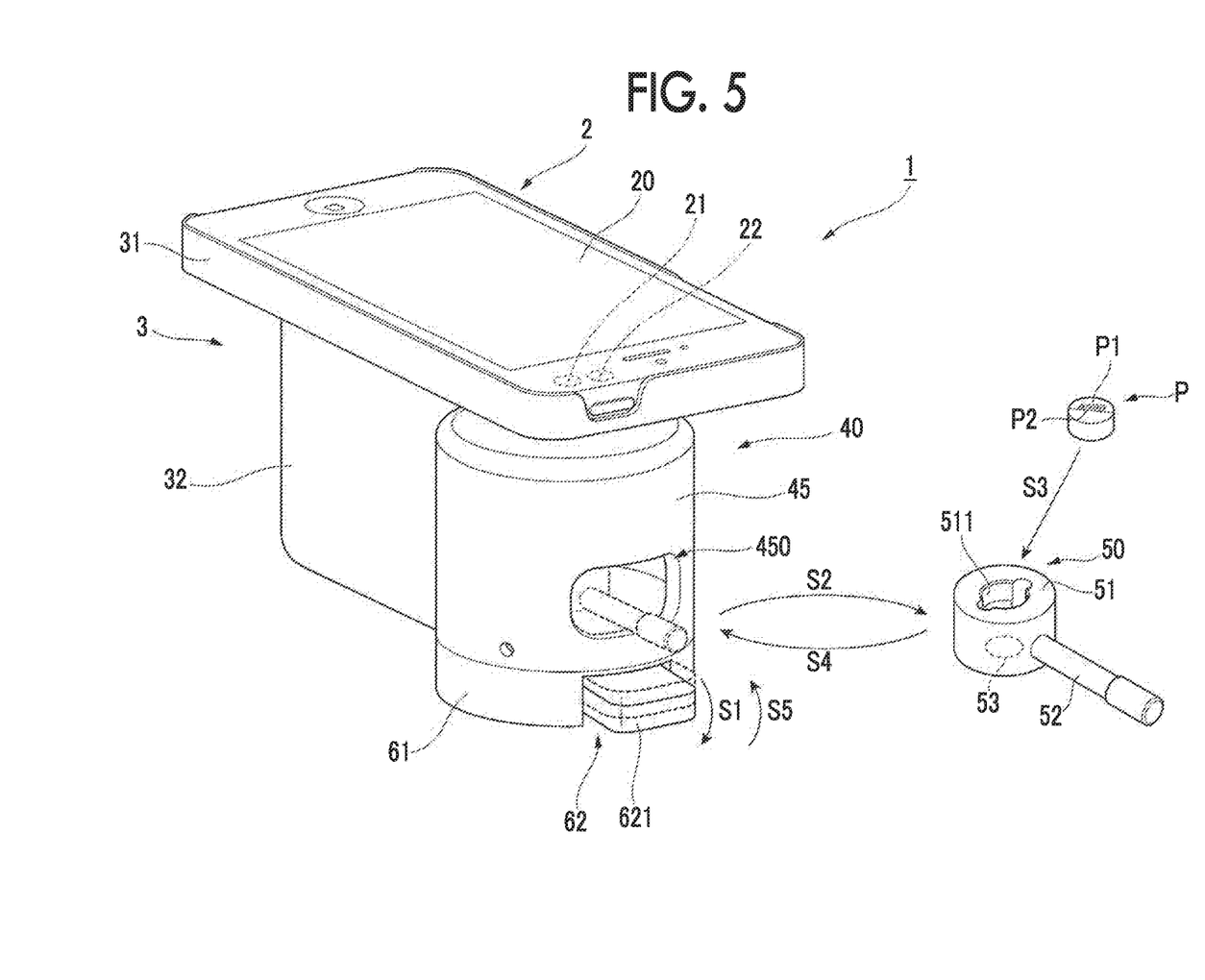
FIG. 5 is a view illustrating an example of an operation of determining a position and a direction of the pill in the photographing system according to this exemplary embodiment.
Figure 6:
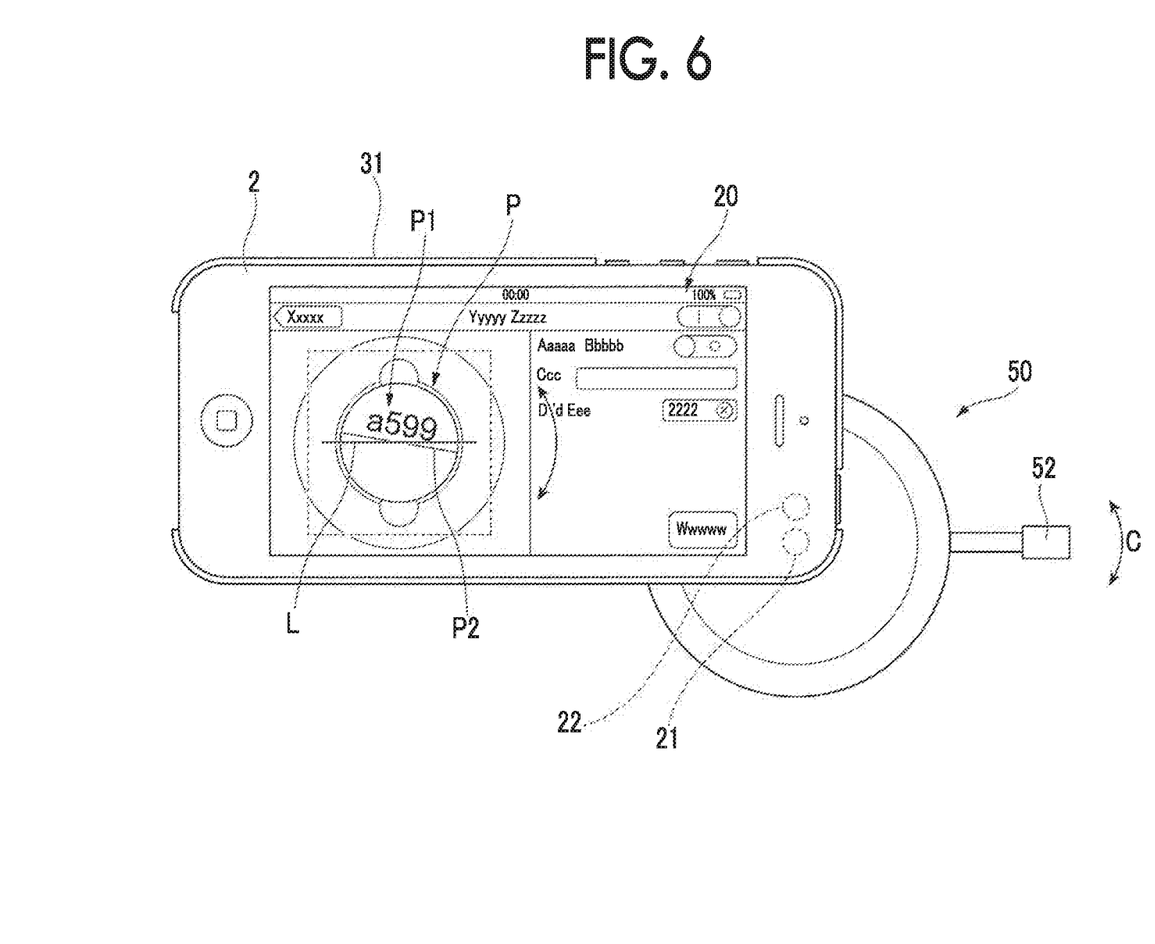
FIG. 6 is a view illustrating an example of the operation of determining the position and the direction of the pill in the photographing system according to this exemplary embodiment.

FIGS. 5 and 6 are views illustrating an example of an operation of determining the position and the direction of the pill P in the photographing system 1 according to this exemplary embodiment. Here, FIG. 5 is a view illustrating an operation of taking out the pill holder 50 from the photographing case 40, and inserting the pill P into the pill holder 50. In addition, FIG. 6 is a view illustrating an operation of adjusting the direction of the pill P by using the pill holder 50. Next, an operation during acquisition of the pattern information of the pill P in the photographing system 1 according to this exemplary embodiment will be described in detail with reference to FIG. 5, FIG. 6, FIG. 2, and the like.

In the photographing system 1 according to this exemplary embodiment, when photographing an image of the pill P to acquire the pattern information, an application for acquisition of the pattern information, which is installed in the portable terminal 2, is activated. According to this, photographing by the camera 21 is initiated while retaining light-emission by the flash lamp 22 of the portable terminal 2, and this aspect is displayed on the display 20.

Then, the pill holder 50 is extracted from the photographing case 40 of the unit for photographing 3 so as to insert the pill P, which is an object to be photographed, into the pill holder 50.

Here, as described above, in a state in which the pill holder 50 is inserted into the photographing case 40, and is fitted to the fitting portion 610, the magnetic substance 53 of the pill holder 50, and the magnet 622 of the fixing member 62 are attracted to each other due to a magnetic force. In addition, the sheet-shaped member 621 of the fixing member 62 is attracted toward a holder holding portion 61 side, and thus the upper surface of the sheet-shaped member 621 is in contact with the holder holding portion 61.

When taking out the pill holder 50 from the photographing case 40, as illustrated in FIG. 5 and FIG. 2, first, the sheet-shaped member 621 is pulled down to a lower side (refer to an arrow S1 in FIG. 5). According to this, the magnet 622 of the fixing member 62 is detached from the magnetic substance 53 of the pill holder 50, and a magnetic force that acts on the magnetic substance 53 weakens. In other words, it enters a released state in which fixing of the pill holder 50 to the holder holding portion 61 due to the magnet 622 of the fixing member 62 is released. According to this, it is possible to separate the pill holder 50 from the holder holding portion 61.

Next, the adjustment member 52 of the pill holder 50 is gripped and is drawn toward a forward side while maintaining the state in which the sheet-shaped member 621 is pulled down, and thus the pill holder 50 is extracted from the insertion hole 450 of the light-shielding member 45 (refer to an arrow S2 in FIG. 5).

In addition, when the pill holder 50 is extracted from the photographing case 40, attraction between the magnetic substance 53 of the pill holder 50 and the magnet 622 of the fixing member 62 due to a magnetic force disappears, and thus the sheet-shaped member 621 moves in a vertically downward direction due to the gravitational force, and is retained in a state of being distant from the holder holding portion 61.

Then, the pill P is inserted into the pill holder 50 that is extracted (refer to an arrow S3 in FIG. 5). Here, for example, the pill P is inserted into the pill opening 511 of the pill holder 50 by pinching the pill P with a pair of tweezers (not illustrated). As described above, the identification symbol P1 for identification of the pill P, or the division line P2 for division of the pill P is formed on the pill P. In addition, in the photographing system 1 according to this exemplary embodiment, as described later, adjustment of the direction of the pill P is performed with the identification symbol P1 or the division line P2, which is formed on the pill P and may be visually recognized with the naked eye, set as a reference. Accordingly, insertion of the pill P is performed in a state in which a surface, on which the identification symbol P1 and the division line P2 are formed, of the pill P faces a vertically upward side. In addition, it is preferable that the pill P is inserted into the pill opening 511 in a state in which the direction of the pill P is approximately set to a direction that is determined in advance with the identification symbol P1 and the division line P2 set as a reference. In this example, in a case where the adjustment member 52 side of the pill holder 50 is set as a forward side, the pill P is inserted into the pill opening 511 so that the direction of the division line P2 is approximately parallel to the adjustment member 52.

Here, the adjustment member 52 is gripped to insert the pill holder 50 in which the pill P is placed into the light-shielding member 45 from the insertion hole 450 (refer to an arrow S4 in FIG. 5). In addition, the pill insertion portion 51 of the pill holder 50 is fitted to the fitting portion 610 of the holder holding portion 61. According to this, the lower surface of the pill insertion portion 51 is loaded on the bottom portion 610b of the fitting portion 610 due to the gravitational force, and thus positioning of the pill P, which is held by the pill insertion portion 51, in the optical axis direction (vertical direction) is made. In addition, the lateral surface of the pill insertion portion 51 faces the side wall 610a of the fitting portion 610 along the peripheral direction, and thus positioning on a surface perpendicular to the optical axis direction of the pill P, which is held by the pill insertion portion 51, is made.

In addition, when the pill insertion portion 51 is fitted to the fitting portion 610, the magnet 622 may be attracted to the magnetic substance 53 due to a magnetic force that acts between the magnetic substance 53 of the pill holder 50 and the magnet 622 of the fixing member 62 (refer to an arrow S5 in FIG. 5). According to this, the upper surface of the sheet-shaped member 621 is in contact with the holder holding portion 61.

In addition, the pill holder 50 (pill insertion portion 51) is fixed and held to the holder holding portion 61 with a force that is determined in advance due to the magnetic force that acts between the magnetic substance 53 and the magnet 622. In other words, the pill holder 50 enters a fixed state in which the pill holder 50 is fixed to the holder holding portion 61 with a force that is determined in advance due to the magnet 622 of the fixing member 62.

In addition, when the pill holder 50 (pill insertion portion 51) is fitted to the fitting portion 610, as illustrated in FIG. 6, the pill P, which is held by the pill holder 50, is photographed by the camera 21, and an image of the pill P, which is photographed by the camera 21, is displayed on the display 20.

In addition, a reference line L for adjustment of the direction of the pill P is displayed on the display 20 by an application that is activated in the portable terminal 2.

In the photographing system 1 according to this exemplary embodiment, a user adjusts the direction of the pill P, which is held by the pill holder 50, while confirming the image that is displayed on the display 20. In this example, the direction of the pill P is adjusted so that the division line P2 of the pill P matches the reference line L that is displayed on the display 20.

Specifically, as indicated by an arrow C in FIG. 6, the user circularly moves the adjustment member 52 of the pill holder 50 with the pill insertion portion 51 set as the center while confirming the image that is displayed on the display 20.

As described above, although being held with a force that is determined in advance due to the magnet 622, the pill insertion portion 51 of the pill holder 50 is not completely fixed. According to this, as the adjustment member 52 is allowed to move, the pill insertion portion 51 rotates at the inside of the fitting portion 610.

In addition, in accordance with the rotation of the pill insertion portion 51, the pill P, which is held by the pill insertion portion 51, also rotates with respect to the camera 21 with the optical axis direction of the camera 21 set as an axis.

As illustrated in FIG. 6, the user rotates the pill P by moving the adjustment member 52 while viewing the image that is displayed on the display 20 in order for the division line P2 of the pill P to match the reference line L that is displayed on the display 20.

In addition, the operation of moving the adjustment member 52 is terminated at a position at which the division line P2 of the pill P matches the reference line L. According to this, rotation of the pill insertion portion 51 is stopped, and the direction of the pill insertion portion 51 and the pill P that is held by the pill insertion portion 51 is fixed due to the magnetic force that acts between the magnetic substance 53 of the pill holder 50 and the magnet 622 of the fixing member 62.

Then, the pattern information of the pill P is acquired based on the application that is activated in the portable terminal 2, and verification (authenticity determination) of the pill P is made.

As described above, in the photographing system 1 according to this exemplary embodiment, it is possible to adjust the position and direction of the pill P with respect to the camera 21 of the portable terminal 2 through a simple operation of inserting the pill P into the pill holder 50, fitting the pill holder 50 to the fitting portion 610 of the photographing case 40, and rotating the pill holder 50.

According to this, it is possible to allow a position of a region of the pill P, from which the pattern information is acquired, to match a photographing region of the camera 21. As a result, even in a minute pattern such as unevenness which is formed on the surface of the pill P and is typically difficult to read out, it is possible to accurately read out the pattern with the camera 21 of the portable terminal 2, and thus it is possible to make a verification (authenticity determination) of the pill P by using a pattern that is read out.

In addition, in this exemplary embodiment, the direction of the pill P is adjusted through an operation of a user by using the division line P2 that is formed on the surface of the pill P. However, the identification symbol P1 and the like other than the division line P2 may be set as a reference to adjust the direction of the pill P, as long as the identification symbol P1 and the like may be visually recognized by the user.

In addition, in this exemplary embodiment, the magnetic substance 53 is provided to the pill holder 50, and the magnet 622 is provided to the fixing member 62 so as to fix the pill holder 50 to the fixing member 62 with the magnetic force that is determined in advance. However, for example, a magnet may be provided to the pill holder 50 and a magnetic substance such as iron may be provided to the fixing member 62 for the same configuration as described above. In addition, magnets may be provided to the pill holder 50 and the fixing member 62, respectively, for attraction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A unit for photographing, comprising:
   a holder that holds a pill to be photographed by a photographing section;
   a supporter that holds the holder so that the pill faces the photographing section at a position that is determined in advance from the photographing section;
   a magnet that fixes the holder, which is supported by the supporter, with a magnetic force; and
   a switch that switches between fixed state in which the holder is fixed by the magnet and a released state in which the fixing of the holder by the magnet is released.

2. The unit for photographing according to claim 1,
   wherein the magnet fixes the holder so that the photographing section does not move in a direction intersecting an optical axis direction, and is rotatable about the optical axis direction.

3. The unit for photographing according to claim 1,
   wherein the magnet generates a magnetic force between the magnet and the holder, and
   the switch switches from the fixed state to the released state by increasing a distance from the holder to the magnetic member.

4. The unit for photographing according to claim 2,
wherein the magnet generates a magnetic force between the magnet and the holder, and
the switch switches from the fixed state to the released state by increasing a distance from the holder to the magnetic member.

5. The unit for photographing according to claim 1, further comprising:
a light shield that covers the holder to shield the pill that is held by the holder, from an outer side; and
a light guide provided on an inner side of the light shield and that guides light from a light source to the pill.

6. The unit for photographing according to claim 2, further comprising:
a light shield that covers the holder to shield the pill that is held by the holder, from an outer side; and
a light guide provided on an inner side of the light shield and that guides light from a light source to the pill.

7. The unit for photographing according to claim 3, further comprising:
a light shield that covers the holder to shield the pill that is held by the holder, from an outer side; and
a light guide provided on an inner side of the light shield and that guides light from a light source to the pill.

8. The unit for photographing according to claim 4, further comprising:
a light shield that covers the holder to shield the pill that is held by the holder, from an outer side; and
a light guide provided on an inner side of the light shield and that guides light from a light source to the pill.

9. The unit for photographing according to claim 1, further comprising:
a mount on which a portable terminal comprising the photographing section is detachably mounted; and
a support that supports the mount so that the portable terminal mounted on the mount faces a direction that is determined in advance.

10. A photographing system, comprising:
a portable terminal that comprises a photographing section; and
a unit for photographing that comprises the portable terminal,
wherein the unit for photographing comprises:
a mount that is mounted on the portable terminal,
a holder that holds a pill to be photographed by the photographing section,
a supporter that holds the holder so that the pill faces the photographing section at a position that is determined in advance from the photographing section,
a magnet that fixes the holder, which is supported by the supporter, with a magnetic force, and
a switch that switches between a fixed state in which the holder is fixed by the magnet and a released state in which the fixing of the holder by the magnet is released.

11. The photographing system according to claim 10,
wherein the portable terminal further comprises:
a display that displays a photographed image that is photographed by the photographing section, and a reference image that serves as a reference for positioning of the pill held by the holder.

* * * * *